United States Patent
Zhang et al.

(10) Patent No.: US 12,254,197 B2
(45) Date of Patent: Mar. 18, 2025

(54) METHOD, ELECTRONIC DEVICE, AND COMPUTER PROGRAM PRODUCT FOR COMPRESSING DATA BLOCK

(71) Applicant: Dell Products L.P., Round Rock, TX (US)

(72) Inventors: Weibing Zhang, Beijing (CN); Lei Gao, Beijing (CN); Jun Wang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/498,495

(22) Filed: Oct. 31, 2023

(65) Prior Publication Data

US 2024/0354013 A1    Oct. 24, 2024

(30) Foreign Application Priority Data

Apr. 18, 2023   (CN) .......................... 202310418658.3

(51) Int. Cl.
*G06F 3/06* (2006.01)

(52) U.S. Cl.
CPC .......... *G06F 3/0626* (2013.01); *G06F 3/0613* (2013.01); *G06F 3/064* (2013.01); *G06F 3/0673* (2013.01)

(58) Field of Classification Search
CPC ...... G06F 3/0626; G06F 3/0613; G06F 3/064; G06F 3/0673; G06F 3/061; G06F 3/0611; G06F 3/0655
See application file for complete search history.

(56) References Cited

U.S. PATENT DOCUMENTS

| | | |
|---|---|---|
| 10,156,993 B1 | 12/2018 | Armangau et al. |
| 10,157,006 B1 | 12/2018 | Armangau et al. |
| 10,430,376 B1 | 10/2019 | Armangau et al. |
| 10,514,861 B1 | 12/2019 | Basov et al. |
| 10,521,400 B1 | 12/2019 | Basov et al. |
| 10,949,107 B1 | 3/2021 | Basov et al. |
| 11,138,185 B1 | 10/2021 | Kuang et al. |
| 11,216,186 B1 | 1/2022 | Armangau et al. |
| 11,526,469 B1 | 12/2022 | Mathews et al. |
| 11,860,834 B1 | 1/2024 | Bassov et al. |

(Continued)

OTHER PUBLICATIONS https://learn.microsoft.com/en-us/windows-server/storage/file-server/smb-compression, retrieved from the internet Jan. 30, 2024.

(Continued)

*Primary Examiner* — Tracy A Warren
(74) *Attorney, Agent, or Firm* — BainwoodHuang

(57) ABSTRACT

Techniques for compressing a data block involve adding a compression flag to a data block after the data block is decompressed by a protocol layer, the compression flag indicating that the data block is compressible or uncompressible. Such techniques further involve acquiring the compression flag of the data block. Such techniques further involve determining, in response to the compression flag of the data block indicating that the data block is compressible, to perform inline compression on the data block. Such techniques further involve preventing, in response to the compression flag of the data block indicating that the data block is uncompressible, the inline compression from being performed on the data block.

20 Claims, 5 Drawing Sheets

(56) References Cited

U.S. PATENT DOCUMENTS

| | | | |
|---|---|---|---|
| 2004/0054858 A1* | 3/2004 | Chandrasekaran | G06F 3/0608 707/E17.005 |
| 2018/0246657 A1* | 8/2018 | Sadowski | H04L 63/123 |
| 2019/0339876 A1* | 11/2019 | Auvenshine | G06F 3/0644 |
| 2019/0339911 A1 | 11/2019 | Bassov et al. | |
| 2020/0042219 A1 | 2/2020 | Wang et al. | |
| 2020/0042220 A1 | 2/2020 | Armangau et al. | |
| 2020/0042399 A1 | 2/2020 | Kuang et al. | |
| 2020/0042616 A1 | 2/2020 | Kuang et al. | |
| 2020/0042617 A1 | 2/2020 | Kuang et al. | |
| 2020/0142628 A1 | 5/2020 | Armangau et al. | |
| 2020/0142643 A1 | 5/2020 | Armangau et al. | |
| 2020/0142903 A1 | 5/2020 | Kuang et al. | |
| 2021/0132813 A1* | 5/2021 | Shabi | G06F 3/0659 |
| 2021/0294505 A1* | 9/2021 | Keller | G06F 3/0619 |
| 2022/0035526 A1* | 2/2022 | Lv | G06F 3/064 |

OTHER PUBLICATIONS https://datatracker.ietf.org/doc/html/rfc46, retrieved from the internet Jan. 30, 2024.
https://www.man7.org/linux/man-pages/man1/sftp.1.html, retrieved from the internet Jan. 30, 2024.
https://techcommunity.microsoft.com/t5/itops-talk-blog/smb-compression-deflate-your-io/ba-p/1183552, retrieved from the internet Jan. 30, 2024.
https://www.snia.org/educational-library/smb3-landscape-and-directions-2022, retrieved from the internet Jan. 30, 2024.
https://storagedeveloper.org/events/sdc-2022/agenda/session/318, retrieved from the internet Jan. 30, 2024.
https://www.youtube.com/watch?v=_xdfHz-V7dc, retrieved from the internet Jan. 30, 2024.
https://docs.microsoft.com/en-us/openspecs/windows_protocols/ms-xca/001e03e3-d1c2-4d51-9d39-e845d9b05959, retrieved from the internet Jan. 30, 2024.

* cited by examiner

METHOD, ELECTRONIC DEVICE, AND COMPUTER PROGRAM PRODUCT FOR COMPRESSING DATA BLOCK

CROSS-REFERENCE TO RELATED APPLICATION

This application claims priority to Chinese Patent Application No. CN202310418658.3, on file at the China National Intellectual Property Administration (CNIPA), having a filing date of Apr. 18, 2023, and having "METHODS, ELECTRONIC DEVICES, AND COMPUTER PROGRAM PRODUCTS FOR COMPRESSING DATA BLOCKS" as a title, the contents and teachings of which are herein incorporated by reference in their entirety.

TECHNICAL FIELD

Embodiments of the present disclosure relate to the technical field of computer storage and, more specifically, to a method, an electronic device, and a computer program product for compressing a data block.

BACKGROUND

In a storage system, data blocks may be compressed to improve the transfer efficiency and to save space. Protocol layer compression is supported in many file sharing protocols to reduce the amount of data transferred over a network, which helps to reduce data transmission time and increase actual data transmission throughput. Inline compression (ILC) is a data compression technique implemented at the file system layer that is often used to optimize the performance and capacity of a storage system. By using the ILC, data can be compressed into smaller sizes, thus saving storage space and improving the efficiency of input/output (I/O) operations.

However, for some uncompressible data blocks, such as high entropy data blocks, it may be futile to perform compression attempts because there is no or very little compression space left. Performing ineffective compression attempts on uncompressible data blocks will waste processor resources and memory resources, and consume longer IO response time.

SUMMARY OF THE INVENTION

According to example embodiments of the present disclosure, a technical solution for compressing a data block is provided, which supports indication, based on compression information of a data block in a protocol layer, of whether to perform inline compression.

In a first aspect of the present disclosure, a method for compressing a data block is provided. The method may include: adding a compression flag to a data block after the data block is decompressed by a protocol layer, the compression flag indicating that the data block is compressible or uncompressible; acquiring the compression flag of the data block; determining, in response to the compression flag of the data block indicating that the data block is compressible, to perform inline compression on the data block; or preventing, in response to the compression flag of the data block indicating that the data block is uncompressible, the inline compression from being performed on the data block. Implementation of the method provided in the first aspect can improve the compression efficiency and performance in a storage system, thus saving processing resources and transfer time.

In a second aspect of the present disclosure, an electronic device is provided. The electronic device includes: a processor; and a memory coupled to the processor and having instructions stored therein, where the instructions, when executed by the electronic device, cause the electronic device to perform operations including: adding a compression flag to a data block after the data block is decompressed by a protocol layer, the compression flag indicating that the data block is compressible or uncompressible; acquiring the compression flag of the data block; determining, in response to the compression flag of the data block indicating that the data block is compressible, to perform inline compression on the data block; or preventing, in response to the compression flag of the data block indicating that the data block is uncompressible, the inline compression from being performed on the data block. Implementation of the electronic device provided in the second aspect can improve the compression efficiency and performance in a storage system, thus saving processing resources and transfer time.

In a third aspect of the present disclosure, a computer program product is provided. The computer program product is tangibly stored in a computer-readable medium and includes computer-executable instructions, wherein the computer-executable instructions, when executed, cause a computer to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure.

As can be seen from the above description, the solutions according to the embodiments of the present disclosure can improve the compression efficiency and performance in a storage system, thus saving processing resources and transfer time. It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
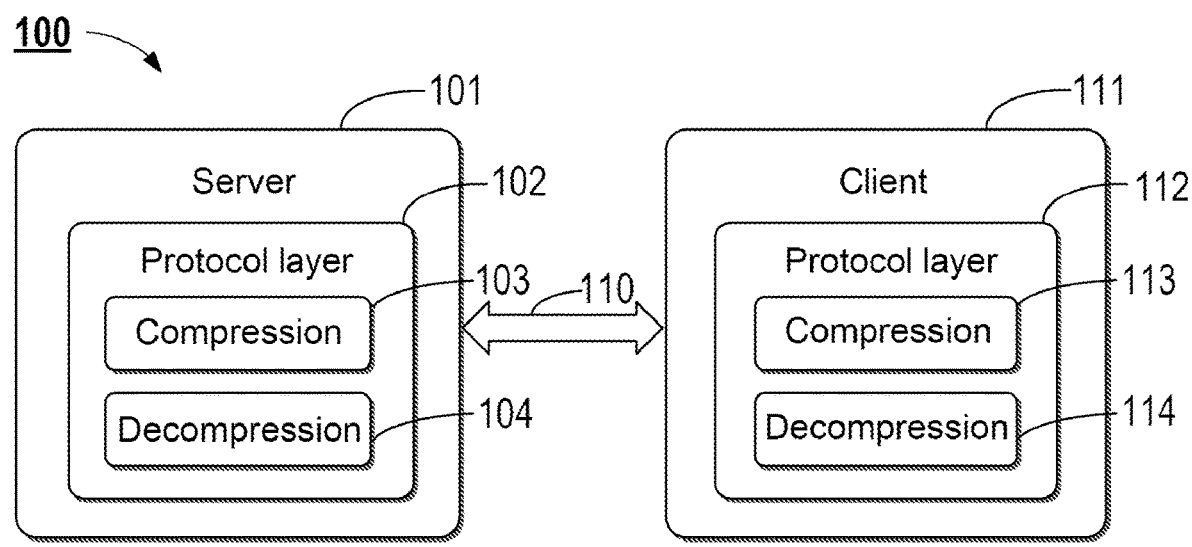
FIG. 1 illustrates a schematic diagram of an application scenario according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In embodiments of the present disclosure, protocol layers refer to different layers in a network communication protocol and the interaction relationship among the layers. In computer networks, protocol architectures commonly used are the Open System Interconnection (OSI) model and the Transfer Control Protocol/Internet Protocol (TCP/IP) model. The OSI model divides a network protocol into seven layers: a physical layer, a data link layer, a network layer, a transfer layer, a session layer, a representation layer, and an application layer. By contrast, the TCP/IP model divides a network protocol into four layers, which are respectively a network interface layer, a network layer, a transfer layer, and an application layer. Each protocol layer has its own specific functions, for example, controlling data transfer, error detection and correction, and so on. The interaction between the protocol layers allows reliable communication between different computers.

Protocols commonly used for file transfer and sharing over networks include the File Transfer Protocol (FTP), the Secure File Transfer Protocol (SFTP), the Server Message Block (SMB) protocol, and so on. Protocol layer data compression refers to compressing a transferred data stream at a protocol layer during communication transfer and decompressing it at a receiving end, so as to reduce the amount of data transferred and improve the transfer efficiency. Protocol layer data compression can effectively reduce the size of data transferred, thus reducing the bandwidth requirement of network transfer. The reduced amount of data transferred results in a corresponding reduction in the transfer time, thus improving the efficiency of network transfer. Protocol layer data compression usually uses lightweight algorithms and thus consumes a relatively small amount of computing resources. Therefore, protocol layer data compression can improve the efficiency of network transfer and reduce the transfer cost.

Inline compression (ILC) is a data compression technique implemented in a storage system, which can compress data before it is written to a storage device and automatically decompress the data when reading it, thus reducing the storage occupied space on the storage device, improving the efficiency and performance of the storage system, and improving the efficiency of I/O operations. The ILC can be used in many different storage systems, including hard disk drives, solid-state drives, storage arrays, and the like. By using the ILC, it is possible to reduce the storage cost, reduce the consumption of the storage system, and improve the storage performance.

For some uncompressible data blocks, such as high entropy data blocks, it may be futile to perform compression attempts because there is no or very little compression space left. Performing ineffective compression attempts on uncompressible data blocks will waste processor resources and memory resources, and consume longer IO response time. However, the embedded compression engine of a storage system is not aware of the compression information of a protocol layer, and the storage system will attempt to perform compression efficiency checks on all the data blocks it receives. For example, for data blocks that actually enter the ILC, the ILC will run compression efficiency checks for them. For high entropy uncompressible data blocks, such as data blocks that have been compressed or encrypted data blocks, in most cases, it is impossible to improve the reduction ratio of compression, and the size of the compressed data may be equal to or even larger than the original data block size. As a result, these compressed blocks are flushed to the disk without saving real space, and the compression attempt may fail since the compression result will not be used. Therefore, for uncompressible blocks, central processing unit (CPU) resources and memory resources are consumed for ineffective compression attempts, and the performance of the storage system is affected. In addition, the longer the time spent on ineffective compression attempts, the longer the IO response time, and the smaller the throughput of data transfer.

The present disclosure proposes a method, an electronic device, and a computer program product for compressing a data block. The method includes: adding a compression flag to a data block after the data block is decompressed by a protocol layer, the compression flag indicating that the data block is compressible or uncompressible; acquiring the compression flag of the data block; determining, in response to the compression flag of the data block indicating that the data block is compressible, to perform inline compression on the data block; and preventing, in response to the compression flag of the data block indicating that the data block is uncompressible, the inline compression from being performed on the data block. Implementing the method proposed in the present disclosure, the compression attempt for a data block by the inline compression of the storage system can be determined based on the compression information for the data block at the protocol layer, which can improve the compression efficiency and effectiveness in the storage system, save processing resources and storage resources, reduce IO wait time and improve IO throughput, and improve the storage efficiency and storage performance of the storage system.

FIG. 1 illustrates a schematic diagram 100 of an application scenario according to some embodiments of the present disclosure. Referring to FIG. 1, data transfer 110 is performed between a server 101 and a client 111. Protocols commonly used for file transfer and sharing include FTP, SFTP, SMB protocols, and so on. In embodiments of the present disclosure, the server 101 and the client 111 negotiate to use a common transfer protocol for the data transfer 110, and the transfer protocol used supports protocol layer compression with connection-level compression, i.e., supports compression and decompression of data at the protocol layer to reduce the amount of data of the transfer 110. This helps to reduce the data transmission time and increase the actual data transmission throughput, as the data transmission requires low network bandwidth after compression.

In embodiments of the present disclosure, the protocol layer can automatically negotiate a compression/decompression protocol between the server 101 and the client 111 and then reduce the size of the data transmitted over the connection, and increase the efficiency of network data transfer by reducing the amount of data to be transferred. When connection-level compression is used, the original data is compressed at the sending end using a compression algorithm, and the compressed data is decompressed at the receiving end. The connection-level compression can be accomplished by establishing a connection that supports data compression between the client 101 and the server 111. When the client 111 sends a request to the server 101, the server 101 will compress the response data using a compression algorithm and return the compressed data to the client 111. Upon receiving the data, the client 111 will decompress and restore the original data. This can significantly reduce the amount of data to be transferred, thereby improving the network performance and response speed.

For example, the server 101 compresses 103 at the protocol layer 102 the data to be transferred, and then transfers 110 the compressed data from the server 101 to the client 111 via the communication connection between the server 101 and the client 111. After the data arrives at the client 111, the compressed data is decompressed 114 by the protocol layer 112 to recover the original data. Similarly, the client 111, when sending data to the server 101, may compress 113 at the protocol layer 112 the data to be transferred and then transfer 110 the compressed data from the client 102 to the server 101 via the communication connection between the server 101 and the client 111. After the data arrives at the server 101, the compressed data is decompressed 104 by the protocol layer 102 to recover the original data.

Compressing data in the protocol layer can save the amount of data that must be transferred over the line. The higher the compression ratio, the greater the amount of transfer that is saved, the less bandwidth the compressed data consumes, and the less time it takes to transmit as a result. When the network bandwidth is the bottleneck for data transfer, compressing the transferred data at the protocol layer will significantly increase the total throughput.

In embodiments of the present disclosure, compression information in the protocol layer can give indications for other compression attempts. For example, for a storage system with inline compression, if the compression information in the protocol layer indicates that the data block is uncompressible, the data block can be made to skip the compression attempt of inline compression, and if the compression information in the protocol layer indicates that the data block is compressible, the data block can be made to keep the compression attempt of inline compression, which helps to save processing resources and memory resources of the storage system, reduce IO wait time and improve IO throughput, and improve the storage efficiency and storage performance of the storage system. Specific illustrations may be further described with reference to the subsequently described embodiments.

Figure 2:
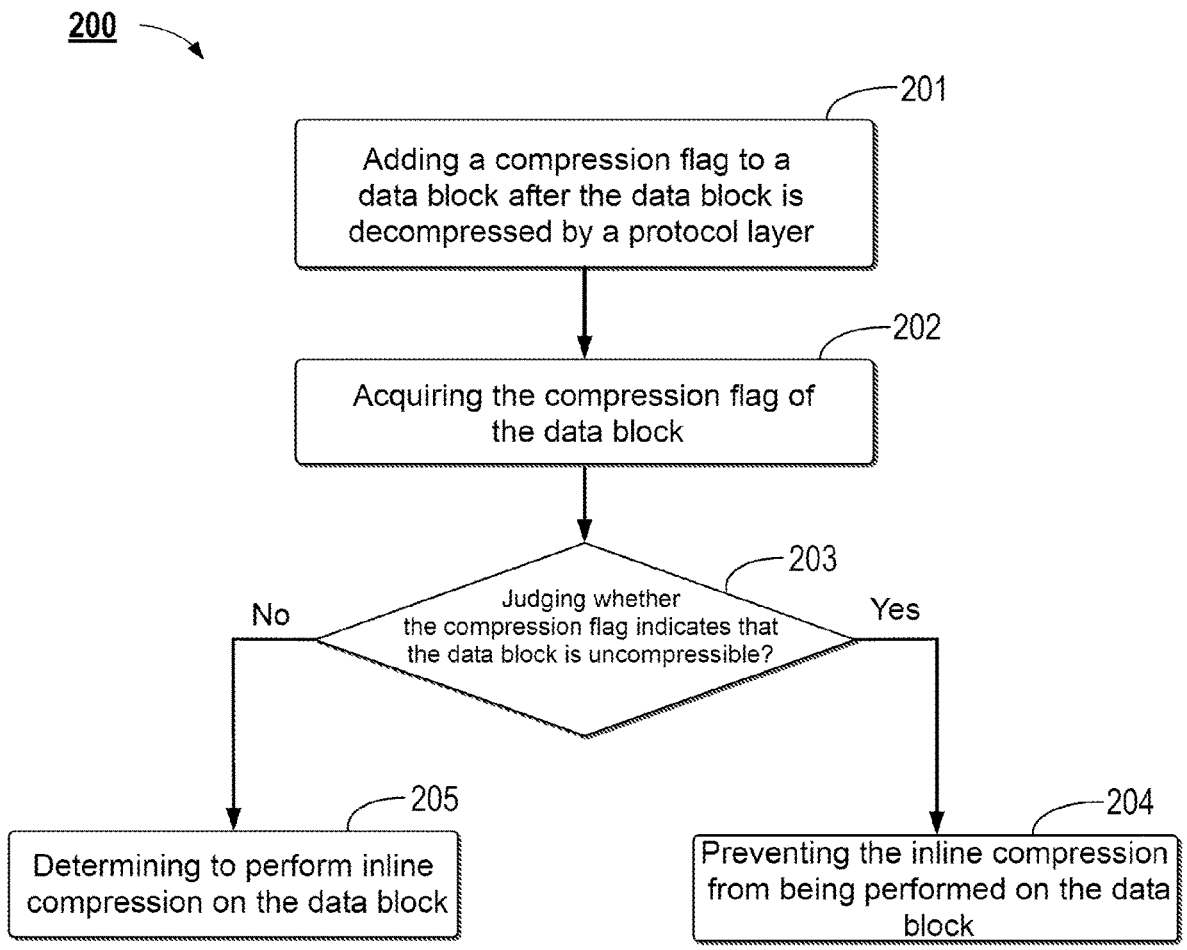
FIG. 2 illustrates a flow chart of a method for compressing a data block according to some embodiments of the present disclosure.

FIG. 2 illustrates a flow chart of a method 200 for compressing a data block according to some embodiments of the present disclosure. The method 200 may be performed by an electronic device. The electronic device may include, but is not limited to, a personal computer (PC), a server computer, a handheld or laptop device, a mobile terminal, a multiprocessor system, or a combination thereof. The embodiments of the present disclosure do not make any limitation to the device type and the like of the electronic device that implements the method 200. It should be understood that, in the embodiments of the present disclosure, the subject implementing the method 200 may be implemented by an entity device or may be implemented by a plurality of entity devices together. It can be understood that the subject implementing the method 200 may be a logical function module in an entity device, or may be a logical function module composed of a plurality of entity devices. It should be understood that, in the following embodiments of the present disclosure, the steps in the method provided in the embodiments of the present disclosure may be performed by one entity device, or the steps in the method provided in the embodiments of the present disclosure may be performed by a plurality of entity devices cooperatively, which is not limited in the embodiments of the present disclosure. In some embodiments, the electronic device may include a protocol layer that supports compression functions and an inline compression layer. It should be understood that the method 200 may also include additional blocks that are not shown and/or may omit blocks that are shown, and the scope of the present disclosure is not limited in this regard.

At block 201, a compression flag is added to a data block after the data block is decompressed by a protocol layer, the compression flag indicating that the data block is compressible or uncompressible. At block 202, the compression flag of the data block is acquired. At block 203, it is judged whether the compression flag indicates that the data block is uncompressible. If yes, at block 204, in response to the compression flag of the data block indicating that the data block is uncompressible, inline compression is prevented from being performed on the data block, and the data block is flushed directly to a disk array. If no, at block 205, in response to the compression flag of the data block indicating that the data block is compressible, it is determined to perform inline compression on the data block, and the compressed data block is then flushed to the disk array. Implementation of the method 200 can improve the compression efficiency and performance in a storage system, thus saving processing resources and transfer time.

Figure 3:
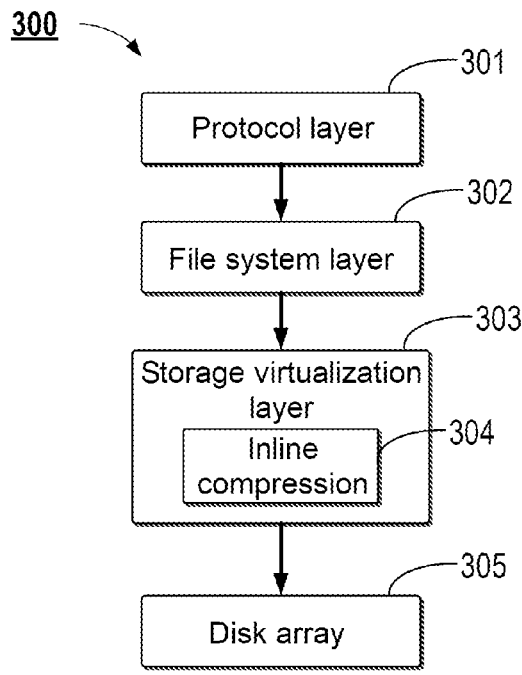
FIG. 3 illustrates a schematic diagram of a storage structure according to some embodiments of the present disclosure.

In some embodiments of the present disclosure, the data block is transferred carrying the compression flag on an input/output (IO) path. Reference can be made to the schematic diagram 300 of an example storage structure illustrated in FIG. 3. As shown in FIG. 3, the storage structure includes a protocol layer 301, a file system layer 302, a storage virtualization layer 303, a disk array 305, and so on. The storage IO path may include: after the transmitted data block is received, the data block is decompressed from the protocol layer 301 and then transferred carrying a compression flag indicating the compressibility from the protocol layer 301 to the file system layer 302, then to the storage virtualization layer 303, until it is finally written to the disk array 305.

The file system layer 302 is a high-level storage tier on which file system services are run and which is responsible for managing data such as files and directories. The storage virtualization layer 303 between the file system layer 302 and the disk array 305 may refer to an intermediate layer that implements storage resource abstraction and management. This layer is mainly responsible for virtualizing the underlying physical storage resources (e.g., disks, flash memory, etc.) to better meet the storage needs of upper layer applications and file systems. For example, the storage virtualization layer 303 can consolidate a plurality of physical storage devices into a logical storage pool while providing various advanced functions such as data compression, snapshot, cloning, remote replication, and the like. On this basis, the storage virtualization layer 303 can also divide storage resources into different logical volumes and provide a unified storage service interface to the upper file system layer 302. Through the storage virtualization layer 303, the user can manage storage resources more flexibly, realize virtualization, optimization, and separation of storage resources, and obtain better storage performance and reliability. It is responsible for virtualizing the underlying physical storage resources, thus enabling flexible management and allocation of storage resources.

In some examples, for example, for a Unity storage system, its IO stack may be divided into an upper deck (UD) IO stack and a lower deck (LD) IO stack. The upper deck IO stack may be responsible for handling upper deck I/O requests and commands and passing these requests and commands to device drivers or other lower deck I/O components, as well as maintaining and managing I/O request queues, scheduling and coordinating I/O operations among various device drivers, and providing some high-level I/O functions and services. The lower deck IO stack is responsible for handling the underlying I/O requests and data streams and passing these requests and data to storage devices or other physical devices. In the Unity storage system, LDs usually include storage controllers, disk drivers, RAID managers, etc. They interact directly with storage devices or other physical devices and perform the underlying operations such as read/write, check, and recovery. In some examples, the upper deck IO stack may include a protocol, a chunk file system (CFS), a 64-bit Unix file system (UFS64), a data volume layer (DVL) Sade, etc., and the lower deck IO stack may include a DVL Safe, a middle redirector, a media logical unit (MLU), etc., wherein the MLU includes functional components for compression and de-duplication, such as a content-based file system (CBFS), physical flash drive compression (PFDC), ILC, and so on.

In embodiments of the present disclosure, the storage virtualization layer 303 includes inline compression (ILC) 304 for compressing data before writing it to the disk array 305. By using the ILC, it is possible to reduce the storage cost, reduce the consumption of the storage system, and improve the storage performance.

In some embodiments of the present disclosure, different storage IO paths can be selected based on the compressibility of a data block as indicated by a compression flag. Since compression attempts for uncompressible blocks can be considered ineffective compression attempts, they should be performed as rarely as possible. For example, in the case where the acquired compression flag of the data block indicates that the data block is compressible, it is determined that the IO path for the data block is a first path that includes inline compression, wherein on the first path, the data block will be subjected to inline compression on the storage virtualization layer 303. Conversely, in the case where the acquired compression flag of the data block indicates that the data block is uncompressible, it is determined that the IO path for the data block is a second path that skips inline compression, wherein on the second path, the data block will skip inline compression on the storage virtualization layer 303. By performing the above operations, it is possible to skip the compression attempts of ILC on uncompressible blocks, while maintaining compression attempts on potentially compressible blocks. This can avoid wastes of CPU processing resources and storage resources in compression efficiency checks of uncompressible blocks, reduce the long response time caused by ineffective compression attempts, and improve the IO throughput.

Figure 4:
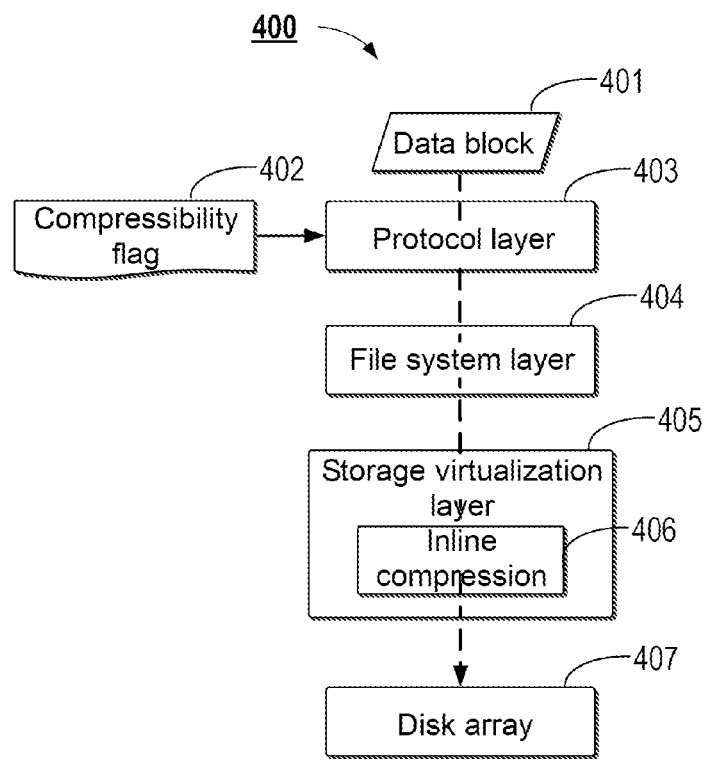
FIG. 4 illustrates a schematic diagram of a storage path according to some embodiments of the present disclosure.

In conjunction with FIG. 3, reference is made to the schematic diagram 400 of a storage path for a compressible block shown in FIG. 4. A received data block 401 is decompressed at the protocol layer 403, this data block 401 is identified as a compressible block based on the compression information (e.g., compression ratio, data block features, and so on), and then a compressibility flag 402 can be added to this data block 401. The compressibility flag 402 will be transferred along with the data block 401 on an IO path. The data block 401 is transferred through a file system layer 404 to a storage virtualization layer 405. The data block 401 is identified as a compressible block based on the compressibility flag 402, then it passes through an inline compression 406 layer on the IO path, and this data block 401 is subjected to ILC 406 before it enters a storage array 407. After the data block 401 is compressed, the compressed data block is flushed and written to the disk array 407. It can be understood that the representation form of the compressibility flag 402 may be different at different layers on the IO path, and different constant names and values may be used at different layers to define the compression flag, which is not limited by embodiments of the present disclosure.

Figure 5:
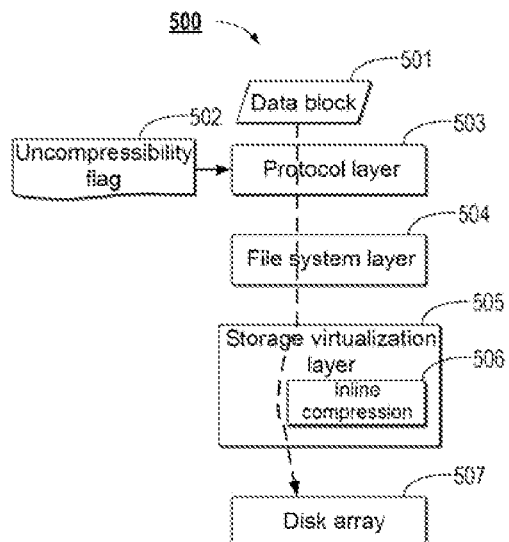
FIG. 5 illustrates a schematic diagram of a storage path according to some embodiments of the present disclosure.

In conjunction with FIG. 3, reference is made to the schematic diagram 500 of a storage path for an uncompressible block shown in FIG. 5. A received data block 501 is decompressed at a protocol layer 503, this data block 501 is identified as an uncompressible block based on the compression information (e.g., compression ratio, data block features, and so on), and then an uncompressibility flag 502 can be added to this data block 501. The uncompressibility flag 502 will be transferred along with the data block 501 on an IO path. The data block 501 is transferred through a file system layer 504 to a storage virtualization layer 505. The data block 501 is identified as an uncompressible block based on the uncompressibility flag 502, then it will skip an inline compression 506 layer on the IO path, and this data block 501 is not subjected to ILC 506 before it enters a storage array 507, that is, the data block is flushed and written directly to the disk array 507. It can be understood that the representation form of the uncompressibility flag 502 may be different at different layers on the IO path, and different constant names and values may be used at different layers to define the compression flag, which is not limited by embodiments of the present disclosure.

For example, "UD_BLOCK_DATA_UNCOMPRESSIBLE= 0x80000" is used to denote the uncompressibility flag at the UD layer, "BlockIOTAG_BLOCK_DATA_UNCOMPRESSIBLE=0x80000" is used to denote the uncompressibility flag at an I/O request packet (IRP) layer, "DVLIOTAG_BLOCK_DATA_UNCOMPRESSIBLE= 0x80000" is used to denote the uncompressibility flag at a DVL layer, "IOTAG_MLU_BLOCK_UNCOMPRESSIBLE=0x80000" is used to denote the uncompressibility flag at an MLU layer, and "MFW_BLOCK_UNCOMORESSIBLE=0x80000" is used to denote the uncompressibility flag at a callback file system (CBFS) layer. The uncompressibility flag can pass through the IO stack in different representations and undergo form transformations at different layers, which, however, all likewise indicate uncompressibility. For example, the uncompressibility flag is transformed from "UD_BLOCK_DATA_UNCOMPRESSIBLE" at the to UD layer "BlockIOTAG_BLOCK_DATA_UNCOMPRESSIBLE" at the IRP layer, to "DVLIOTAG_BLOCK_DATA_UNCOMPRESSIBLE" at the DVL layer, to "IOTAG_MLU_BLOCK_UNCOMPRESSIBLE" at the MLU layer, to "MFW_BLOCK_UNCOMPRESSIBLE" at the CBFS layer, and so on.

In embodiments of the present disclosure, there are no special restrictions on a compression flag that marks the compressibility of a data block. In some embodiments, it is possible to mark only uncompressible data blocks, and not mark compressible data blocks. As long as it is possible to distinguish compressibility from uncompressibility through a flag, it is applicable to various embodiments of the present disclosure.

In general, a compression attempt can be made to compress data to determine whether it can be compressed. If the amount of data after compression is smaller than the original amount of data, it is illustrated that the data is compressible. However, not all types of data can be compressed effectively. For example, data that has been highly compressed (e.g., JPEG, MP3, etc.) generally cannot be compressed further. Also, random data is difficult to be compressed, because random data does not have any predictable pattern. Therefore, to determine whether data is compressible, features of the data and the type of compression algorithm need to be considered. If the data has a reusable pattern or structure, it may be possible to achieve compression by a compression algorithm.

In some embodiments of the present disclosure, the features of a data block may be identified, and a compression flag for the data block may be generated based on the identified features of the data block. If the identified features of the data block indicate that the data block is high entropy data, encrypted data, random data, data whose size is smaller than a predetermined size (i.e., data with a very small size), or data that has been compressed, it is determined that the generated compression flag will indicate that the data block is uncompressible. For example, high entropy data has a data density that is already so large that there is substantially no room for compression. Encrypted data is not compressible under any compression algorithm. A data block with randomness usually does not contain repeated patterns or structures, so it is difficult to compress. If a data block is very small (e.g., only a few bytes), a compression algorithm may not be able to compress it further because it has already reached the minimum file size. For data that has been compressed, the file size may be increased when it is compressed again, because multiple compressions may introduce additional information and destroy the original compression structure.

In some embodiments of the present disclosure, the compressibility of a data block can be identified by determining the compression ratio of the data block in a protocol layer. A predetermined threshold is set, and if the compression ratio of the data block is less than the predetermined threshold, a compression flag is set to indicate that the data block is uncompressible. If the compression ratio of the data block is greater than or equal to the predetermined threshold, the compression flag is set to indicate that the data block is compressible. Here, the compression ratio of the data block may be a ratio of the size of the decompressed data to the size of the compressed data.

Figure 6:
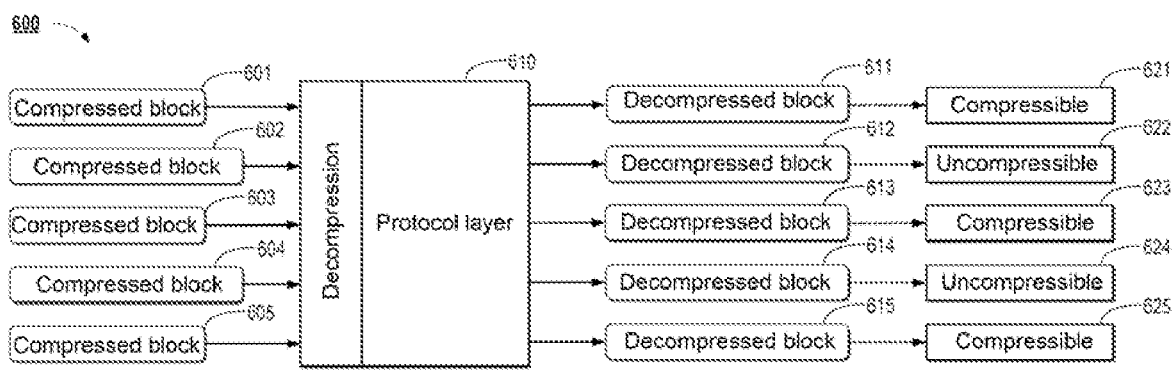
FIG. 6 illustrates a schematic diagram of adding a compression flag to a data block according to some embodiments of the present disclosure.

Referring to FIG. 6, which illustrates a schematic diagram 600 of adding a compression flag to a data block. As shown in FIG. 6, after receiving a plurality of compressed blocks, a client decompresses them at a protocol layer 610. Different compressed blocks have different compressibilities. For example, after a compressed block 601 is decompressed, a decompressed block 611 is obtained, and after comparing the size of the decompressed block 611 with that of the compressed block 601, the compression ratio of the data block is obtained; after determining that the compression ratio is greater than or equal to a predetermined threshold, the block is marked as compressible 621. After a compressed block 602 is decompressed, a decompressed block 612 is obtained, and after comparing the size of the decompressed block 612 with that of the compressed block 602, the compression ratio of the data block is obtained; after determining that the compression ratio is less than the predetermined threshold, the block is marked as uncompressible 622. Similarly, a compression ratio is calculated for a compressed block 603 and a decompressed block 613, and it is obtained that this data block is compressible 623; a compression ratio is calculated for a compressed block 604 and a decompressed block 614, and it is obtained that this data block is uncompressible 624; and a compression ratio is calculated for a compressed block 605 and a decompressed block 615, and it is obtained that this data block is compressible 625.

By determining the compression information for compression at the protocol layer, a compressibility mark is added to the data block to subsequently indicate whether to perform an ILC compression attempt. For uncompressible blocks, ILC compression attempts can be skipped to eliminate ineffective compression processing, thus saving CPU resources, memory resources, and processing time. For compressible blocks, it is necessary to perform ILC compression attempts, which can save storage space.

In some other embodiments of the present disclosure, a compression algorithm used by the protocol layer for the data block is the same as a compression algorithm used by the inline compression for the data block. In this way, the criteria for judging the compressibility of data blocks at the protocol layer are substantially the same as the criteria for determining the compressibility of data blocks at the inline compression layer. If a data block is judged to be uncompressible based on the compression ratio of the data block in the protocol layer, it is overwhelmingly probable that the data block will be judged to be uncompressible in the inline compression layer. Therefore, in the case where the protocol layer and the inline compression layer use the same compression algorithm, their judgment for the compressibility is substantially the same, and it is possible to judge, based on the compressibility by the protocol layer, whether a compression attempt for inline compression needs to be performed. For data blocks that have been judged as uncompressible in the protocol layer, skipping ineffective compression attempts in the inline compression layer can save processing resources and time and improve the performance of the storage system.

In addition to qualitatively judging the compressibility of data blocks, it is also possible to more accurately set the amount of balance of compressibility between different layers. In some other embodiments of the present disclosure, if a first compression algorithm used in the protocol layer is different from a second compression algorithm used in the inline compression layer, predetermined thresholds for different compression ratios can be set for the protocol layer and the inline compression layer to compensate for the compressibility gap caused by the different compression algorithms. Using a strong compression algorithm can save more space, whereas using a weak compression algorithm can provide a higher compression efficiency. For the protocol layer and the inline compression layer, the compression algorithms in the protocol layer are usually weaker than those in the inline compression layer, because the protocol layer is more concerned with data transfer efficiency whereas the inline compression layer is more concerned with saving storage space. In some examples, if the compression degree of the first compression algorithm of the protocol layer is less than the compression degree of the second compression algorithm of the inline compression, that is, the first compression algorithm of the protocol layer compresses data blocks more "lightly" than the second compression algorithm of the inline compression, then a first predetermined threshold for the compression ratio of the protocol layer can be set to be greater than a second predetermined threshold for the compression ratio of the inline compression. That is, the protocol layer should be set to have a higher compression threshold than the inline compression layer in order to compensate for the fact that the compression algorithm of the protocol layer is weaker than that of the inline compression layer. Vice versa, and it will not be repeated here.

According to the above described embodiments of the present disclosure and their combined embodiments, the efficiency and performance of the storage system in compressing data can be improved. It should be understood that the implementations illustrated in FIGS. 3 through 6 above are only schematic, and depending on an actual application, the architecture or process illustrated in FIGS. 3 through 6 may take other different forms and may also include more or fewer one or more functional modules and/or units, which may be partially or fully implemented as hardware modules, software modules, firmware modules, or any combination thereof, and embodiments of the present disclosure are not limited in this regard.

It can be understood that the specific names and/or protocols of the various components of the system described herein are intended only to help those skilled in the art better understand the ideas of the present disclosure and are not intended to limit the scope of the present disclosure in any way. Further, in other embodiments, more or better components may be included, as well as alternative components having the same or similar functions.

Figure 7:
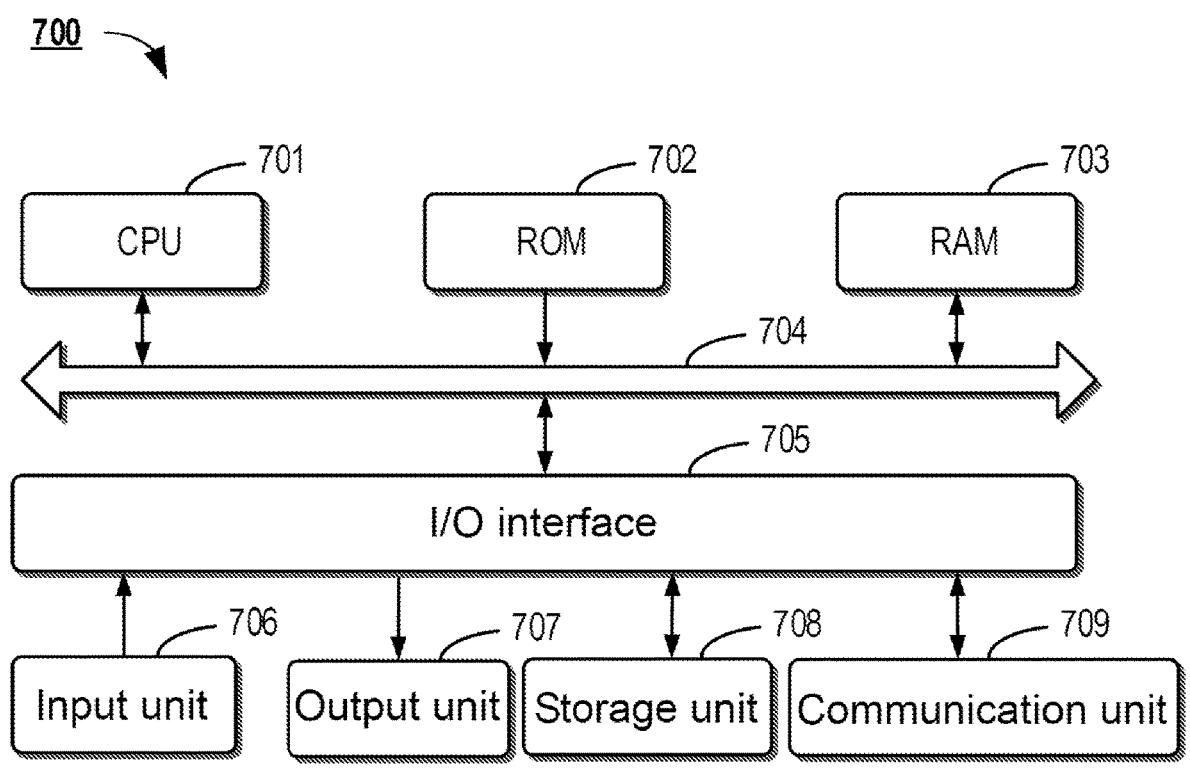
FIG. 7 illustrates a schematic structural diagram of a device that can be used to implement embodiments of the present disclosure.

FIG. 7 illustrates a schematic structural diagram of an example device 700 that can be used to implement some embodiments of the present disclosure. The device 700 may be implemented as a server or a PC. The embodiments of the present disclosure do not limit the specific implementation type of the device 700. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network such as the Internet and/or various telecommunication networks.

The processing unit 701 may execute the various methods and/or processing described above, such as the method 200. For example, in some embodiments, the method 200 may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded onto the RAM 703 and executed by the CPU 701, one or more steps of the method 200 described above may be performed. Alternatively, in other embodiments, the CPU 701 may be configured to perform the method 200 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The embodiments of the present disclosure have been described above. The foregoing description is illustrative rather than exhaustive, and is not limited to the embodiments disclosed. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for compressing a data block, comprising:
adding a compression flag to a data block after the data block is decompressed by a protocol layer, the compression flag indicating that the data block is compressible or uncompressible;
acquiring the compression flag of the data block;
determining, in response to the compression flag of the data block indicating that the data block is compressible, to perform inline compression on the data block; and
preventing, in response to the compression flag of the data block indicating that the data block is uncompressible, the inline compression from being performed on the data block.

2. The method according to claim 1, further comprising:
identifying features of the data block; and
generating the compression flag of the data block according to the identified features of the data block.

3. The method according to claim 2, further comprising:
determining that the generated compression flag indicates that the data block is uncompressible according to the indication by the identified features of the data block that the data block is any of the following: high entropy data, encrypted data, random data, data whose size is smaller than a predetermined size, or data that has been compressed.

4. The method according to claim 3, further comprising:
determining a compression ratio of the data block in the protocol layer;
setting, in response to the compression ratio of the data block being less than a predetermined threshold, the compression flag to indicate that the data block is uncompressible; and
setting, in response to the compression ratio of the data block being greater than or equal to the predetermined threshold, the compression flag to indicate that the data block is compressible.

5. The method according to claim 4, wherein the compression ratio of the data block is a ratio of the size of decompressed data to the size of compressed data.

6. The method according to claim 5, wherein a first predetermined threshold for a compression ratio of the protocol layer is set to be greater than a second predetermined threshold for a compression ratio of the inline compression based on the fact that the compression degree of a first compression algorithm of the protocol layer is less than the compression degree of a second compression algorithm of the inline compression.

7. The method according to claim 1, wherein the data block is transferred carrying the compression flag on an input/output (IO) path, the IO path comprising passing through the protocol layer.

8. The method according to claim 7, further comprising:
determining, in response to the compression flag of the data block indicating that the data block is compressible, that the IO path for the data block is a first path; and
performing the inline compression on the data block on the first path.

9. The method according to claim 7, further comprising:
determining, in response to the compression flag of the data block indicating that the data block is uncompressible, that the IO path for the data block is a second path; and
skipping the inline compression for the data block on the second path.

10. The method according to claim 1, wherein a compression algorithm used by the protocol layer for the data block is the same as a compression algorithm used by the inline compression for the data block.

11. An electronic device, comprising:
a processor; and
a memory coupled to the processor and having instructions stored therein, wherein the instructions, when executed by the processor, cause the electronic device to perform operations comprising:
adding a compression flag to a data block after the data block is decompressed by a protocol layer, the compression flag indicating that the data block is compressible or uncompressible;
acquiring the compression flag of the data block;
determining, in response to the compression flag of the data block indicating that the data block is compressible, to perform inline compression on the data block; and
preventing, in response to the compression flag of the data block indicating that the data block is uncompressible, the inline compression from being performed on the data block.

12. The electronic device according to claim 11, wherein the operations further comprise:
identifying features of the data block; and
generating the compression flag of the data block according to the identified features of the data block.

13. The electronic device according to claim 12, wherein the operations further comprise:
determining that the generated compression flag indicates that the data block is uncompressible according to the indication by the identified features of the data block that the data block is any of the following: high entropy data, encrypted data, random data, data whose size is smaller than a predetermined size, or data that has been compressed.

14. The electronic device according to claim 13, wherein the operations further comprise:
determining a compression ratio of the data block in the protocol layer;
setting, in response to the compression ratio of the data block being less than a predetermined threshold, the compression flag to indicate that the data block is uncompressible; and
setting, in response to the compression ratio of the data block being greater than or equal to the predetermined threshold, the compression flag to indicate that the data block is compressible.

15. The electronic device according to claim 14, wherein the compression ratio of the data block is a ratio of the size of decompressed data to the size of compressed data.

16. The electronic device according to claim 15, wherein a first predetermined threshold for a compression ratio of the protocol layer is set to be greater than a second predetermined threshold for a compression ratio of the inline compression based on the fact that the compression degree of a first compression algorithm of the protocol layer is less than the compression degree of a second compression algorithm of the inline compression.

17. The electronic device according to claim 11, wherein the data block is transferred carrying the compression flag on an input/output (IO) path, the IO path comprising passing through the protocol layer.

18. The electronic device according to claim 17, wherein the operations further comprise:

determining, in response to the compression flag of the data block indicating that the data block is compressible, that the IO path for the data block is a first path; and performing the inline compression on the data block on the first path.

19. The electronic device according to claim 17, wherein the operations further comprise:

determining, in response to the compression flag of the data block indicating that the data block is uncompressible, that the IO path for the data block is a second path; and skipping the inline compression for the data block on the second path.

20. A computer program product having a non-transitory computer readable medium which stores a set of instructions to compress a data block; the set of instructions, when carried out by computerized circuitry, causing the computerized circuitry to perform a method of:

adding a compression flag to a data block after the data block is decompressed by a protocol layer, the compression flag indicating that the data block is compressible or uncompressible;

acquiring the compression flag of the data block;

determining, in response to the compression flag of the data block indicating that the data block is compressible, to perform inline compression on the data block; and preventing, in response to the compression flag of the data block indicating that the data block is uncompressible, the inline compression from being performed on the data block.

* * * * *